UNITED STATES PATENT OFFICE.

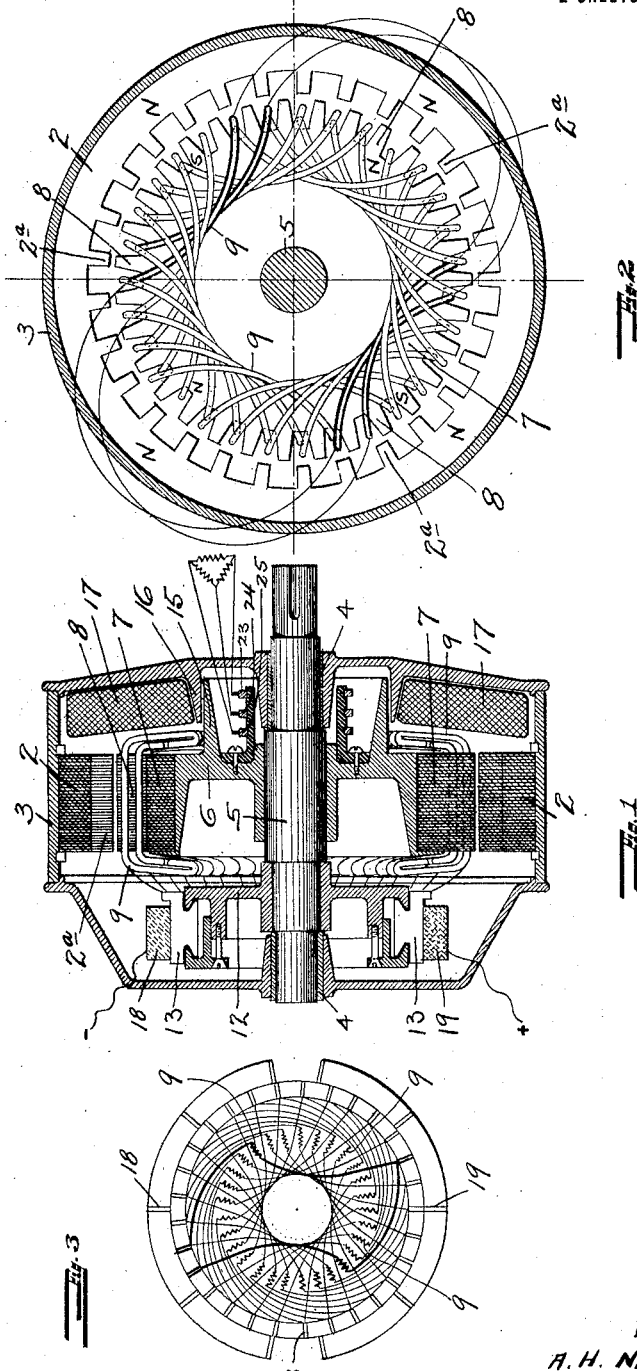

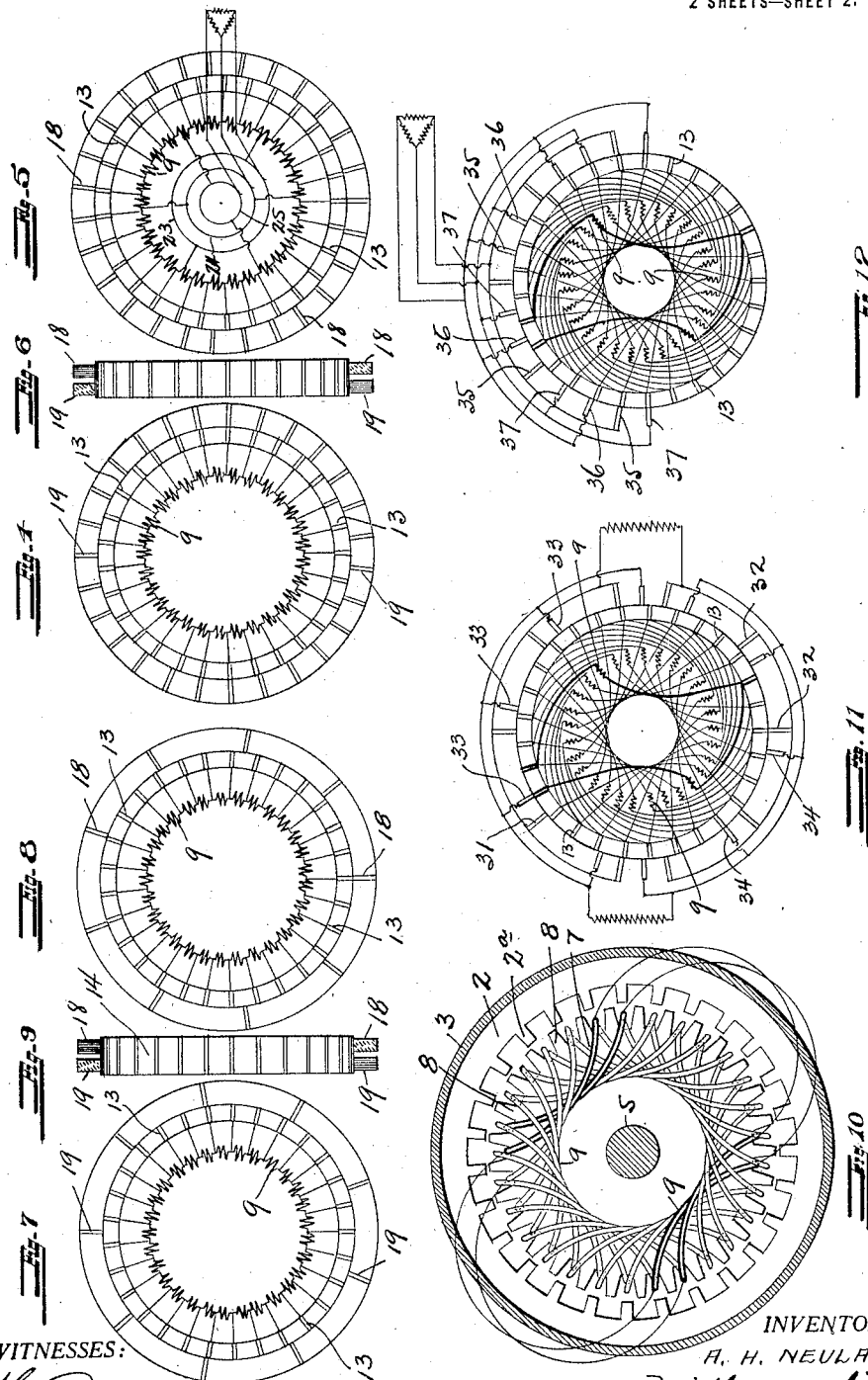

ALFONS H. NEULAND, OF SAN FRANCISCO, CALIFORNIA.

DYNAMO-ELECTRIC MACHINE.

1,178,455. Specification of Letters Patent. Patented Apr. 4, 1916.

Application filed July 11, 1914. Serial No. 850,418.

*To all whom it may concern:*

Be it known that I, ALFONS H. NEULAND, a subject of the Czar of Russia, and a resident of the city and county of San Francisco, State of California, have invented certain new and useful Improvements in Dynamo-Electric Machines, of which the following is a specification.

The invention relates to dynamo electric machines and particularly to such machines of the commutating type.

One of the objects of the invention is to provide a dynamo electric machine which will generate alternating current either single phase or polyphase, having a high frequency relative to the rotation of the member generating the current and commutate such currents either to direct currents or currents of lower frequency.

Another object of the invention is to provide such a machine which may be used as a direct current motor or generator, or as an alternating current low frequency motor or generator.

A further object of the invention is to provide such a machine by which alternating current, either single phase or polyphase, may be converted to either a direct current or to an alternating current having a relatively low frequency, or by which a direct current or an alternating current of low frequency may be converted to an alternating current of high frequency.

Another object of the invention is to provide a dynamo electric machine which has a high weight efficiency and a high electrical efficiency.

In accordance with my invention I provide a machine having a toothed stator and a toothed inductor, the number of teeth on the two elements being different, whereby they are alined at a plurality of portions and non-alined at a plurality of portions, the alined and non-alined portions having a greater angular velocity than the rotor, thereby producing a progressive flux having a high angular velocity. There is also provided an armature winding which is cut by the progressing flux, inducing therein an alternating current having a very high frequency relative to the rotation of the rotor, and commutating means consisting of a series of conducting elements connected to the armature winding, and a series of conducting elements relatively movable with respect to the other conducting elements, and arranged so that some of the elements in the first series are always in contact with some of the elements in the second series.

The invention possesses other advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form because my invention may be embodied in a multiplicity of forms, each being a species of my said invention. It is also understood that by the claims succeeding the description of my invention, I desire to cover the invention in whatever form it may be embodied.

Referring to said drawings: Figure 1 is a vertical section of one form of the machine of my invention. Fig. 2 is a cross section somewhat diagrammatic of the machine shown in Fig. 1, showing one form of arrangement of the induction windings, and a few of the connections between the coils of the winding, the connected coils being shown in heavier lines. Fig. 3 is a diagrammatic representation of the arrangement of the windings commutator segments and brushes in the machine shown in Fig. 1. Fig. 4 is a diagrammatic representation of the arrangement of the windings and commutator segments of a modified type of machine and the brushes of one polarity. Fig. 5 is a similar view showing the arrangement of the brushes of the opposite polarity, and the alternating current connections. Fig. 6 is a side view of the commutator showing the position of the two sets of brushes. Fig. 7 is a diagrammatic representation of a modified form of brush arrangement, showing the brushes of one polarity. Fig. 8 is a similar view showing the arrangement of the brushes of the other polarity. Fig. 9 is a side view of the commutator showing the position of the two sets of brushes. Fig. 10 is a cross-section of the machine, somewhat diagrammatic, showing one form of construction which may be employed for producing a low frequency alternating current, only a few of the connections between the coils being shown for the sake of clarity, as in Fig. 2. Fig. 11 is a diagrammatic representation of the arrangement of the windings and commutator segments of the machine shown in Fig. 1, the brushes being arranged for a two phase current. Fig. 12 is a similar representation showing a three phase brush arrangement.

The machine of my invention may be employed either as a motor or a generator, but for the purposes of description herein I shall describe its operation as a motor.

The machine may be employed for many different purposes, some of which will be described hereinafter, and the construction and arrangement of the parts varies somewhat with the different uses to which the machine is to be put. When used as a direct current motor or generator, or a low frequency alternating current motor or generator, for example, the collector rings and their associated brushes and leads are dispensed with, but when used as a converter for example, the collector rings and their associated elements are employed. By varying the number of coils, commutator segments and brushes in the direct current arrangement, an alternating current of low frequency may be collected at the commutator brushes.

The apparatus comprises a laminated stator element 2 provided on its face with a plurality of teeth or projections 2ª, which are preferably regularly spaced. The stator element is supported in a housing 3 which is provided with bearings 4 for the rotor shaft 5. Secured to the rotor shaft 5 is the inductor member or rotor which comprises the iron core 6 and the laminated annular rotor element 7 which is provided on its face adjacent the toothed face of the stator with a plurality of teeth or projections 8, which are preferably regularly spaced. The number of teeth on the stator differs from the number of teeth on the rotor, so that the teeth are radially alined at a plurality of portions and are non-alined at a plurality of intermediate portions. The difference in the number of teeth on the two elements determines the number of points of alinement, and in the construction illustrated I have shown a difference of two teeth, which produces two alined portions.

Arranged preferably on the rotor and preferably embedded between the teeth thereon are the coils 9 of the armature winding, which may be arranged in any desired manner in accordance with the usual practice, there being as many coils in the armature winding in the D. C. type of machine as there are teeth on the stator, or, in the present instance, there being two less coils in the winding than there are teeth on the rotor. In the construction shown in Figs. 2, 11 and 12, I have employed a series armature winding, but any other type of winding may be employed.

Secured to the rotor shaft 5 is a hub 12 upon which are arranged the commutator segments 13 which are suitably insulated from each other, there being as many segments as there are coils. The coils are connected to the segments in the usual manner, the connection varying with the type of winding employed. Contacting with the commutator 14 are brushes, whose number and position will hereinafter be set forth.

The core 6 which carries the toothed rotor element 7 is provided, within the circle of the rotor, with a concentric cylindrical projection 15 which extends into a cylindrical projection 16 on the housing. Mounted on the cylindrical projection 16 is the magnetizing coil 17, the magnetic circuit of which includes the housing, the projections 15 and 16; the periphery of the core 6, the toothed rotor element and the toothed stator element, the magnetic flux passing principally through those portions of the machine at which the teeth are alined.

In the machine herein illustrated, I have employed a stator having twenty-nine teeth and a rotor having thirty-one teeth, such an arrangement producing two alined portions and two intermediate non-alined portions. In this arrangement there are two portions of alinement, 180° apart, between the rotor and stator teeth. The teeth on the stator and rotor are progressively more and more non-alined between the alined portions and the portions at right angles thereto, at which latter portions they are in complete staggered relation. It will be seen that upon rotation of the rotor a distance equal to one tooth pitch on the rotor, the alined portion of the teeth is gradually shifted around the circumference of the rotor for an angular distance of 180°, thereby causing the movement of the path of least magnetic reluctance for one-half a complete revolution for every angular movement of the rotor for one tooth pitch, or in other words, the axis of magnetization between the stator and rotor makes one complete revolution for each movement of the rotor through twice a tooth pitch. Since the number of teeth on the rotor is greater than the number on the stator, the rotation of the axis of magnetization is in the same direction as that of the rotor, and it is apparent that its rotation would be in the opposite direction if the number of teeth on the stator was greater than the number on the rotor. Thus, the rotation of the rotor produces a revolving magnetic field in inductive relation to the winding. Each revolution of the magnetic field induces two complete cycles in the windings, but since the revolving field travels in the same direction as the rotor, the windings on the inductor, since they follow the progression of the magnetic field, are cut by the alternating field only twenty-nine times, instead of thirty-one times, or in other words, there are twenty-nine complete cycles of current induced in the windings for each rotation of the rotor. The number of cycles per revolution of generated current in the inductor windings is equal to the number of teeth on the rotor minus the number of alined portions in a machine in which the field rotates in the same direction as the rotor and is equal to the number of teeth on the rotor plus the number of alined portions when the field rotates in the opposite direction to the rotor. The direction of rotation of the field with respect to the direction of rotation of the rotor is determined by the direction of rotation of the alined portion. In the machine shown in Fig. 2 there are two more teeth on the rotor than on the stator so that the alined portion rotates in the same direction as the rotor, but if there were two more teeth on the stator than on the rotor, the alined portion would rotate in the opposite direction to the rotor. In the present construction there are twenty-nine coils in the armature winding, or as many coils as there are cycles of generated current.

In order to commutate the current thus generated, the winding is provided with a number of taps or leads, which are connected to the commutator segments. The commutator is divided circumferentially into a plurality of insulated segments, and the number of segments with relation to the number of coils determines the character of the current. If the number of commutator segments equals the number of cycles of current induced in the coils by each rotation of the rotor, the current delivered to the commutator brushes will be a direct current. If the number of commutator segments be increased or decreased from the number of cycles per revolution of the inductor, the neutral points on the commutator will gradually get ahead of or fall behind the revolving magnetic field, resulting in a slowly alterating current in the commutator brushes. The brushes contact with the commutator at neutral points. The number of brushes which are employed in order to cause the point of contact or commutation to travel in the same direction as the field must be less than the number of segments on the commutator and the difference in number is determined by the number of alined portions, and when the point of commutation is to travel in the opposite direction from the field the number of brushes is greater by the same number. The positive and negative brushes are so arranged that when a current passes from them to the commutator segments and thence to the armature windings, the current will produce a magnetomotive force which will neutralize the field flux on one side of the middle of the alined portion and will have the same direction as that of the field flux on the other side of the middle, as is indicated in Fig. 2. On each side of the center line or middle there is produced a positive polarity (N) by the field current, whereas the current in the armature windings will produce a negative polarity (S) on one side and a positive polarity on the other side of the middle line, tending to neutralize the field flux on one side and increasing it on the other, whereby a torque is produced which causes the rotor to revolve toward the side at which the flux is increased.

In the construction diagrammatically illustrated in Figs. 4, 5 and 6, omitting for the present the alternating current connections, I have shown twenty-nine regularly spaced commutator segments 13 and twenty-seven regularly spaced positive brushes 18, all connected together, and twenty-seven regularly spaced negative brushes 19, all connected together. The planes of the two sets of brushes are axially alined and both sets of brushes engage the commutator segments. On account of the difference in number of the brushes in each set and the number of segments on the commutator, there are two positions diametrically opposite each other at which the brushes in either set are fully alined or in contact with the commutator segments, and two diametrically opposite portions, half way between the alined or contacting portions, at which the brushes are staggered with relation to the commutator segments. Between the alined or contacting portions and the staggered portions the distances between the brushes and the segments vary, increasing from the alined position to the staggered position. The negative brushes 19 are so arranged with relation to the positive brushes 18 that the plane of alinement of the negative brushes and the segments occurs at an angle of 90 degrees from the plane of alinement of the positive brushes and the commutator segments. With reference to the teeth on the stator and rotor, the positive brush is in contact with the segment which is connected to the coil which surrounds the alined portion, and the negative brush is in contact with the segment which is connected to the coil which surrounds the portion of maximum non-alinement. Mechanically considered, the brushes may have any position with respect to the alined and non-alined portions depending upon the arrangement of the leads from the coils to the segments. The angle between the points of full contact of the positive and negative brushes is the same as the angle between the fully alined and non-alined teeth on the stator and rotor. The point of contact of brush and segment moves at the same rate of progression as the field, thereby causing the point of contact to maintain its neutral position with respect to the field. The current entering the commutator from a positive brush passes through the coils of the armature winding intervening between the positive brush and the negative brush.

It is not essential in order to produce the required progression of the point of contact of brush and segment at the same angular velocity as the field that the number of brushes employed be equal to the number of segments minus the number of portions of tooth alinement. In Figs. 7, 8 and 9 I have shown a construction in which only nine positive brushes and nine negative brushes are employed, this being accomplished by employing a number of brushes equal to one-third of the number of commutator segments minus the number of portions of tooth alinement, in the present instance (29—2)÷3=9. The brushes in each set are connected together and are regularly spaced, and the sets are arranged with relation to each other in the same manner as the sets in the construction shown in Figs. 4, 5 and 6. Similar results are obtained by this construction with the exception that the point of contact jumps to each third segment instead of to the adjacent segment. In this arrangement also the points of alinement or contact of the segments and brushes in each set are not diametrically opposite since two brushes are in contact with the segments on one side of the commutator and only one brush on the other side, but the effective result is the same.

In the constructions shown in Figs. 4 to 9 inclusive two sets of brushes, each set extending completely around the commutator, are employed, the brushes in each set making contact with the commutator segments at diametrically opposite portions. This arrangement permits the employment of a multiple winding in a four pole machine. A machine in which the stator and rotor teeth are alined at two portions is a four pole machine, two of the poles being formed at the alined portions and two at the non-alined portions. The coils of the armature winding may have a full or fractional pitch, but the spacing is substantially that of a four pole machine.

By employing a series winding, illustrated in Figs. 2 and 3, in which the current passes from one coil to a coil diametrically opposite, thence to the coil adjacent the first coil and thence to the coil diametrically opposite and so on, the number of brushes may be further decreased without varying from the results obtained. In this construction the positive brushes 18 are arranged around one-half of the commutator and the negative brushes 19 are arranged around the other half of the commutator, the brushes being arranged so that at least one positive brush and one negative brush is always in contact with the commutator segments. In the construction shown in Fig. 3, I have employed five regularly spaced positive brushes and five regularly spaced negative brushes which are so arranged with relation to the commutator segments, that current flows through the proper coils of the armature winding, producing torque as above described.

When it is desired to provide a machine which will produce or consume an alternating current of low frequency, the number of coils commutator segments and brushes is varied. In the present construction I have shown a stator provided with twenty-nine teeth and a rotor provided with thirty-one teeth, such an arrangement operating to induce a current of twenty-nine cycles per revolution in the armature winding. In order to obtain a direct current I employ twenty-nine coils in the armature winding and twenty-nine commutator segments. Should the number of coils be increased to thirty-one and the number of segments to thirty-one, and the number of brushes to twenty-nine, the neutral points on the commutator will gradually get ahead of the revolving magnetic field, resulting in this instance in a current having a frequency of two cycles per revolution. When it is desirable to retain the same commutator segment and brush relation that is shown in Figs. 3 to 9, a low frequency alternating current may be produced by providing a machine having a different number of stator teeth, rotor teeth and coils. In the construction shown in Fig. 10, I have employed a stator having twenty-seven teeth, a rotor having twenty-nine teeth and a series armature winding having twenty nine coils, such construction operating to induce a current of twenty seven cycles per revolution in the armature winding, and since there are twenty-nine commutator segments, the neutral points on the commutator will gradually drop behind the revolving magnetic field, resulting in an alternating current of low frequency at the brushes. The number of cycles in the generated current is equal to the difference between the number of segments in the commutator and the number of cycles per revolution produced in the armature winding, whether there is a greater or a less number of cycles per revolution than there are commutator segments.

This machine may also be used as a converter and may be employed to variously convert the character of the current delivered to it. It may be arranged to convert from direct current to high frequency alternating current and vice versa, and it may be employed to convert high frequency alternating current and vice versa. By arranging collector rings 23, 24, 25 on the rotor or rotor shaft, insulated from each other and from the shaft, and properly connecting these rings with the armature winding, as shown in Fig. 5, or any other suitable manner, alternating current may be fed to or taken from the collector rings. The introduction of an alternating current into the collector rings, and the synchronous rotation of the rotor as determined by the supplied frequency, will result in a direct current at the commutator brushes if the construction of the machine is such that, acting as a generator, direct current is produced at the commutator brushes. This direct current construction is shown in the drawings and has been described heretofore. If in such construction direct current is supplied to the commutator, alternating current is produced at the collector rings, the frequency of the alternating current depending upon the speed of the rotor.

If the arrangement of windings, commutator segments and brushes is such that when acting as a generator, low frequency alternating current is produced at the commutator brushes, and alternating current of high frequency is supplied to the collector rings, an alternating current of low frequency is obtained at the commutator brushes. If low frequency current is supplied to the commutator and the rotor rotated in synchronism with the supplied current, a high frequency current is produced at the collector rings.

Instead of arranging the armature winding on the rotor, the winding may be arranged on the stator, in which case the commutator will be stationary and the commutator brushes mounted on and revoluble with the rotor shaft, or the windings may be connected to the brushes and the commutator revolve with the rotor or the armature winding may be arranged on both stator and rotor.

When the machine is constructed to produce an alternating current at the commutator this current may be collected as a single phase current, or as a two phase current, or as a three phase current. In Fig. 11 I have shown a series wound machine arranged for the collection of two phase current. The brushes of one phase 31—32 are arranged similarly to the brushes in Fig. 3, and the brushes of the other phase 33—34 are arranged adjacent the brushes 31—32 and spaced from them a distance equal to one-fourth the distance between the brushes 31 or 32. In Fig. 12 I have shown a three phase arrangement in combination with a series winding. The brushes 35 are in the same relative position as the upper set of brushes in Fig. 3 and the brushes 36 and 37 are evenly spaced between the brushes 35. When a series winding is employed the three lower series of brushes may be dispensed with.

From the above, it will be seen that this machine possesses great flexibility, and among other uses may be employed for the following purposes: (1) An alternating current, single or polyphase, high frequency per revolution, generator or synchronous motor, in which case the current is taken off from or supplied to the collector rings. (2) An alternating current, single or polyphase, low frequency per revolution, generator or synchronous motor, in which case current is taken from or supplied to the commutator brushes. (3) Direct current generator or motor, in which case the current is taken from or supplied to the brushes on the commutator. (4) Alternating current commutating motor, in which use the current is supplied to the brushes on the commutator. (5) To convert alternating current, single or polyphase, having a high frequency, to an alternating current single or polyphase, having a low frequency, in which case the current is impressed at the collector rings and delivered at the commutator brushes. (6) To convert alternating current, single or polyphase, having a low frequency, to an alternating current single or polyphase, having a high frequency, in which the current is impressed at the commutator brushes and delivered to the collector ring brushes. (7) To convert alternating current, single or polyphase, having a high frequency, to a direct current, in which use the current is impressed on the collector rings and delivered at the commutator brushes. (8) To convert direct current into alternating current, single or polyphase, having a high frequency per rotation of the inductor, in which use the current is impressed at the commutator brushes and delivered at the collector rings.

The output relative to the weight of this machine, as a generator or motor, is very great due to the high velocity with which the magnetic field revolves, thereby cutting the winding of the inductor, but it will be readily understood that its output is considerably greater when used as a rotary converter, since only a portion of the impressed current traverses the winding, the rest passing directly from the brushes on the commutator to the collector rings, or vice versa.

The efficiency of such a machine in case of a generator or motor, is likewise very high on account of the small amount of iron and copper required in proportion to its output, and its efficiency is much higher in case of the converter, by reason of its greatly increased capacity as above explained.

I claim:

1. In a dynamo electric machine of the commutating type, a toothed stator, a toothed rotor, an armature winding and commutating means comprising a series of of rotatable conducting elements, and a series of stationary conducting elements, said two series of elements being arranged to produce a progression of the point of contact between the elements of the two series with relation to the stationary and rotatable elements, said armature winding being connected to one of said series of conducting elements.

2. In a dynamo electric machine of the commutating type, a toothed stationary element, a toothed rotatable element, means including said elements for producing a rapidly revolving magnetic field having a greater angular velocity than said rotatable element, an armature winding in inductive relation with said field, and commutating means comprising a series of rotatable conducting elements and a series of stationary conducting elements, said two series of elements being arranged to produce a progression of the point of contact between the elements of the two series with relation to the rotatable conducting elements, said armature winding being connected to one of said series of conducting elements.

3. In a dynamo electric machine of the commutating type, a stationary element and a rotatable element, means including said rotatable element for producing a rapidly revolving magnetic field having a greater angular velocity than said rotatable element, an armature winding in inductive relation with said field, and commutating means comprising a series of rotatable conducting elements and a series of stationary conducting elements, the armature winding being connected to the elements of one of said series, said two series of elements being arranged to produce a progression of the point of contact between the elements of the two series, with relation to the rotatable conducting elements.

4. In a dynamo electric machine of the commutating type, a rotating element, an armature winding, means including said rotating element for producing a rapidly revolving magnetic field having a greater angular velocity than said rotating element in inductive relation to said winding, and commutating means comprising a series of rotatable conducting elements and a series of stationary conducting elements, said two series of elements being arranged to produce a progression of the point of contact between the elements of the two series with relation to the stationary conducting elements, said armature winding being connected to one of said series of conducting elements.

5. In a dynamo electric machine of the commutating type, a toothed stator, a toothed rotor, an armature winding and commutating means comprising a series of conducting elements connected to the armature winding, and a series of conducting elements relatively movable with respect to the other series and arranged so that one of the elements in one series is always in contact with one of the elements in the other series and so that the point of contact progresses with relation to the stator and rotor.

6. In a dynamo electric machine of the commutating type, a toothed stator, a rotor having teeth spaced regularly around its entire periphery differing in number from those on said stator, an armature winding and commutating means comprising a series of conducting elements equal in number to the stator teeth connected to said winding, and a series of conducting elements relatively rotatable with respect to the first series.

7. In a dynamo electric machine of the commutating type, a toothed stator, a rotor having teeth spaced regularly around its entire periphery, differing in number from those on said stator, an armature winding and commutating means comprising a series of conducting elements equal in number to the coils of the winding connected to said winding, and a series of conducting elements relatively rotatable with respect to said first named elements, and arranged to produce a progression of the point of contact between the elements of the two series with relation to the stator.

8. In a dynamo electric machine of the commutating type, a toothed stator, a rotor having teeth spaced regularly around its entire periphery, differing in number from those on said stator, an armature winding having as many coils as there are stator teeth, and commutating means comprising a series of conducting elements equal in number to the coils of the winding and individually connected thereto, and a series of conducting elements relatively movable with respect to said first series, the number and arrangement of the elements in the second series being such as to produce a progression of the point of contact between the elements of the two series with respect to the rotor.

9. In a dynamo electric machine of the commutating type, a regularly spaced toothed stator, a rotor having a different number of regularly spaced teeth than the stator, an armature winding having as many coils as there are teeth on the stator, and commutating means comprising a series of regularly shaped insulated conducting elements equal in number to the number of coils in the armature winding and connected to said coils, and two series of conducting elements arranged to engage said first named series, the number and spacing of the elements comprising each of the two series being such as to produce a progression of the points of contact between the elements of the first series and the elements of the two second series with relation to the rotor.

10. In a dynamo electric machine of the commutating type, a regularly toothed stator, a regularly toothed rotor, the angular pitch of the stator and rotor teeth being different, and armature winding having as many coils as there are stator teeth, a commutator having as many active segments as there are stator teeth, the coils of the winding being connected to said segments and a plurality of brushes engaging said commutator, the number and spacing of the brushes being such as to produce a progression of the point of contact between the brushes and the segments with relation to the stator and rotor.

11. In a dynamo electric machine of the commutating type, an armature winding comprising a plurality of coils, a rotatable element, means including said element for producing a revolving magnetic field of greater angular velocity than said element in inductive relation to said winding, a commutator having as many active segments as there are coils in said winding connected to said coils, and a plurality of stationary brushes engaging said commutator, the number and spacing of the brushes being such as to produce a progression of the point of contact between said brushes and commutator segments around the commutator.

12. In a dynamo electric machine of the commutating type, a toothed stator, a toothed rotor, an armature winding comprising a plurality of coils, a commutator having as many active segments as there are coils in said winding, said segments being connected to said coils, and two series of brushes engaging said commutator, one series of brushes being positive and one series being negative, the brushes in each series being arranged to produce a progression of the point of contact of brush and segment with relation to the rotor.

13. In a dynamo electric machine of the commutating type, a toothed stator, a toothed rotor, an armature winding, alternating current conductors connected to said winding and commutating means comprising a series of rotatable conducting elements, and a series of stationary conducting elements, said two series of elements being arranged to produce a progression of the point of contact between the elements of the two series with relation to the rotatable conducting elements, said armature winding being connected to one of said series of conducting elements.

14. In a dynamo electric machine of the commutating type, a toothed stationary element and a toothed rotatable element, means including said elements for producing a revolving magnetic field having a greater angular velocity than said rotor, an armature winding in inductive relation with said field, alternating current conductors connected to said armature winding and commutating means comprising a series of rotatable conducting elements, and a series of stationary conducting elements, said two series of elements being arranged to produce a progression of the point of contact between the elements of the two series with relation to the stationary and rotatable conducting elements, said armature winding being connected to one of said series of conducting elements.

15. In a dynamo electric machine of the commutating type, a toothed stator, a toothed rotor, an armature winding, alternating current conductors connected to said winding and commutating means comprising two series of conducting elements, one of said series being rotatable with respect to the other, the number and spacing of the elements in said two series being such as to produce a progression of the point of contact between the elements of the two series with respect to the stator and rotor, and means connecting the elements of one of said series with the armature winding.

16. In a dynamo electric machine of the commutating type, a rotating element, an armature winding, means including said rotating element for producing a rapidly revolving magnetic field having a greater angular velocity than said rotating element in inductive relation to said winding, alternating current conductors connected to said winding and commutating means comprising a series or rotatable conducting elements, and a series of stationary conducting elements, said two series of elements being arranged to produce a progression of the point of contact between the elements of the two series with relation to the stationary conducting elements, and means connecting the armature winding to one of said series of conducting elements.

17. In a dynamo electric machine of the commutating type, a regularly toothed stator, a rotor having regularly spaced narrow teeth, an armature winding, alternating current conductors connected to said winding and commutating means comprising a series of conducting elements connected to the armature winding, and a series of conducting elements relatively movable with respect to the other series and arranged so that one of the elements in one series is always in contact with one of the elements in the other series, and so that said point of contact progresses with relation to the rotor.

18. In a dynamo electric machine of the commutating type, a toothed stator, a rotor having regularly spaced narrow teeth differing in number from the teeth on said stator, an armature winding, alternating current conductors connected to said winding and commutating means comprising a series of conducting elements equal in number to the stator teeth connected to said winding, and a series of conducting elements relatively rotatable with respect to said first series.

19. In a dynamo electric machine of the commutating type, a toothed stator, a rotor having regularly spaced narrow teeth differing in number from the teeth on said stator, an armature winding comprising a plurality of coils, alternating current conductors connected to said winding, and commutating means comprising a series of conducting elements equal in number to the coils of the winding connected to said winding, and a series of conducting elements relatively rotatable with respect to said first named elements and arranged to produce a progression of the point of contact between the elements of the two series with relation to the rotor.

20. In a dynamo electric machine of the commutating type, a toothed stator, a rotor having regularly spaced narrow teeth differing in number from the teeth on said stator, an armature winding having as many coils as there are teeth on the stator, alternating current conductors connected to said coils and commutating means comprising a series of conducting elements equal in number to the coils of the winding and individually connected thereto, and a series of conducting elements relatively movable with respect to said first series, the number and arrangement of the elements in the second series being such as to produce a progression of the point of contact between the elements of the two series with respect to the rotor.

21. In a dynamo electric machine of the commutating type, a toothed stator, a rotor having a different number of teeth than the stator, an armature winding having as many coils as there are teeth on the stator, alternating current conductors connected to said winding and commutating means comprising a series of insulated conducting elements regularly spaced and equal in number to the number of coils in the armature winding and connected to said coils, and two series of conducting elements arranged to engage said first named series, the number and spacing of the elements in each of the said two series being such as to produce a progression of the points of contact between the elements of the first series and the elements of the two second series with relation to the rotor.

22. In a dynamo electric machine of the commutating type, a toothed stator, a rotor having a different number of teeth than said stator, an armature winding having as many coils as there are stator teeth, alternating current conductors connected to said winding, a commutator having as many active segments as there are stator teeth, and a plurality of brushes engaging said commutator, the number and spacing of the brushes being such as to produce a progression of the point of contact between brushes and segments with relation to the rotor.

23. In a dynamo electric machine of the commutating type, an armature winding comprising a plurality of coils, alternating current conductors connected to said winding, a rotatable element, means including said element for producing a revolving magnetic field of greater angular velocity than said element in inductive relation to said winding, a commutator in fixed relation to the rotatable element having as many active segments as there are coils in said winding connected to the segments, and a plurality of stationary brushes engaging said commutator, the number of brushes being such as to produce a progression of the point of contact between said brushes and commutator segments around the commutator.

24. In a dynamo electric machine of the commutating type, a series of rotatable conducting elements and a series of stationary conducting elements, said two series of elements being arranged to produce a progression of the point of contact between the elements of the two series with relation to the elements of the two series.

In testimony whereof, I have hereunto set my hand at San Francisco, California, this 2nd day of July, 1914.

ALFONS H. NEULAND.

In presence of—
H. G. PROST,
J. B. GARDNER.